M. PARIDON.
MACHINE FOR MAKING BOOK MATCHES.
APPLICATION FILED MAY 11, 1918. RENEWED APR. 23, 1920.

1,360,439.

Patented Nov. 30, 1920.
10 SHEETS—SHEET 1.

Inventor
Michael Paridon
by his Attorneys

M. PARIDON.
MACHINE FOR MAKING BOOK MATCHES.
APPLICATION FILED MAY 11, 1918. RENEWED APR. 23, 1920.

1,360,439.

Patented Nov. 30, 1920.
10 SHEETS—SHEET 4.

Inventor
Michael Paridon
by his Attorney

M. PARIDON.
MACHINE FOR MAKING BOOK MATCHES.
APPLICATION FILED MAY 11, 1918. RENEWED APR. 23, 1920.

1,360,439.

Patented Nov. 30, 1920.
10 SHEETS—SHEET 7.

Inventor
Michael Paridon
by his Attorney
John N. Nolan

M. PARIDON.
MACHINE FOR MAKING BOOK MATCHES.
APPLICATION FILED MAY 11, 1918. RENEWED APR. 23, 1920.

1,360,439.  
Patented Nov. 30, 1920.  
10 SHEETS—SHEET 10.

Inventor  
Michael Paridon  
by his Attorney

UNITED STATES PATENT OFFICE.

MICHAEL PARIDON, OF BARBERTON, OHIO, ASSIGNOR TO THE DIAMOND MATCH COMPANY, OF CHICAGO, ILLINOIS, A CORPORATION OF ILLINOIS.

MACHINE FOR MAKING BOOK-MATCHES.

1,360,439.  Specification of Letters Patent.  Patented Nov. 30, 1920.

Application filed May 11, 1918, Serial No. 233,856. Renewed April 23, 1920. Serial No. 376,173.

*To all whom it may concern:*

Be it known that I, MICHAEL PARIDON, a citizen of the United States, and resident of Barberton, in the county of Summit and State of Ohio, have invented certain new and useful Improvements in Machines for Making Book-Matches, of which the following is a specification.

This invention relates to a machine for making "book matches" of the kind wherein card matches, of paste-board or wood veneer, are provided with a flexible book-like cover.

A machine for making match card strips of paper board, is disclosed in Patent No. 636,170 dated October 31, 1899, and a machine for subdividing a series of superposed card strips, whether of paper or wood, and combining the superposed divisions thereof with flexible covers, is described in Patent No. 1,042,472 dated October 29, 1912.

In the manufacture of relatively long match cards or strips from wood veneer, adapted to be sub-divided and the divisions thereof then assembled and bound with covers into book form, many difficulties are encountered, the chief of which results from the variable warping and shrinking of the thin material of which the cards or strips are composed; and, therefore, the present invention has been particularly, though not exclusively, designed to produce, in a rapid and economical manner from wood veneer, card matches of proper book-form size, assemble such matches in individual groups and combine the respective groups with suitable covers.

Generally stated, the invention comprises, in a book-match making machine, a source of card-match supply, a traveling carrier adjacent thereto having a succession of compartments or chambers into each of which a plurality of cards are flatwise disposed one upon another, and cover-applying instrumentalities to which the superposed cards are transferred from said chambers.

More specifically, the invention comprehends such a machine having a source of card-match supply comprising mechanism so constructed and organized that rows of card matches are rapidly produced and delivered row by row, in progressive order, to the chambered carrier.

The invention also comprises means whereby a supplemental card, constituting a protective flap or flame guard, is combined with the superposed card matches and their covers.

The invention also comprises various novel features of construction and combinations of elements which will be hereinafter described.

The precise scope of the invention will be defined in the appended claims.

In the preferred form of my invention illustrated in the annexed drawings, the source of card-match supply comprises a machine designed and constructed to produce the unit card matches in series. The main supporting frame of the match machine comprises a bed 20, standards 21 and a table 22. The main driving shaft, 23, has its bearings in boxes on the frame standards and is driven from a suitable source of power. In the present instance this shaft is provided at one end with a gear wheel 24 in mesh with a gear 25 on the power shaft of a suitably-located electric motor 26.

A series of vertical hoppers 27 are arranged side by side in spaced relation to each other upon the table 22. In the present instance four hoppers are employed, but the number may be increased or reduced if desired without departing from my invention.

Figure 3:
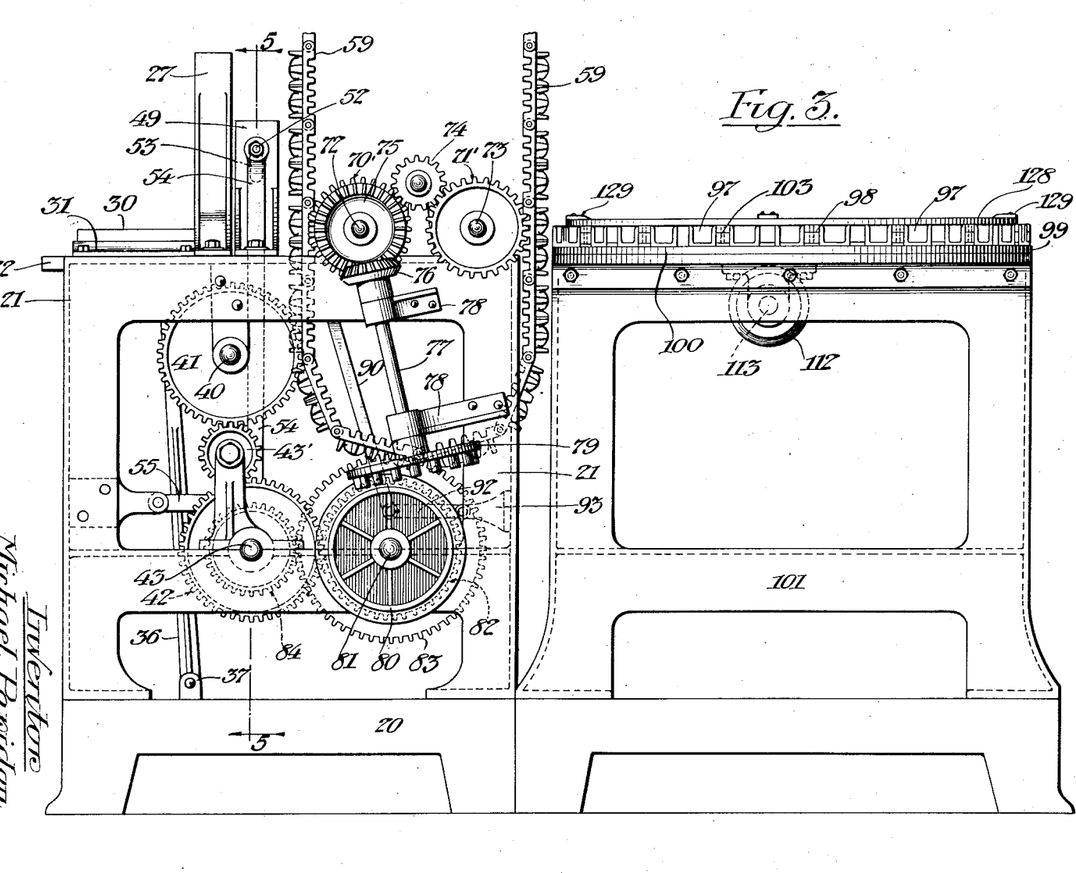
Fig. 3 is an elevation of the end of the machine adjacent the card-match making mechanism.
Figure 4:
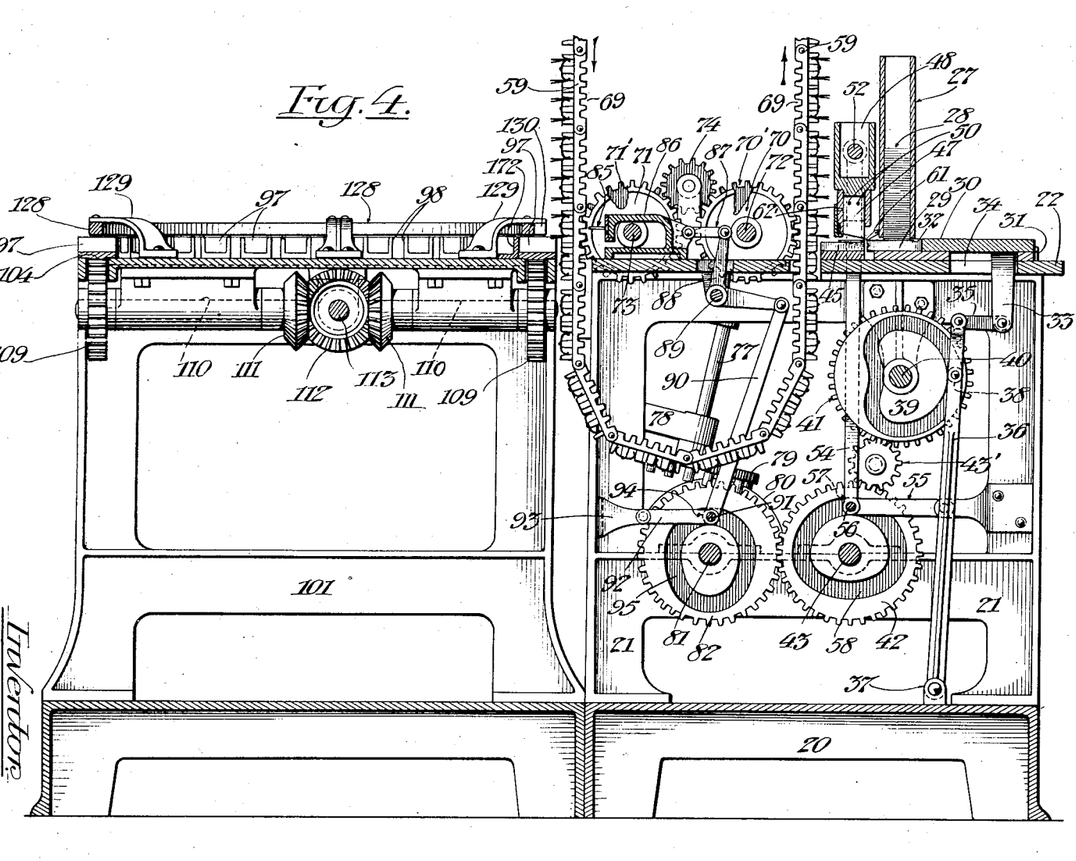
Fig. 4 is a vertical section of the machine on a plane intersecting the card-match making mechanism, as on the line 4—4 of Fig. 1.
Figure 5:
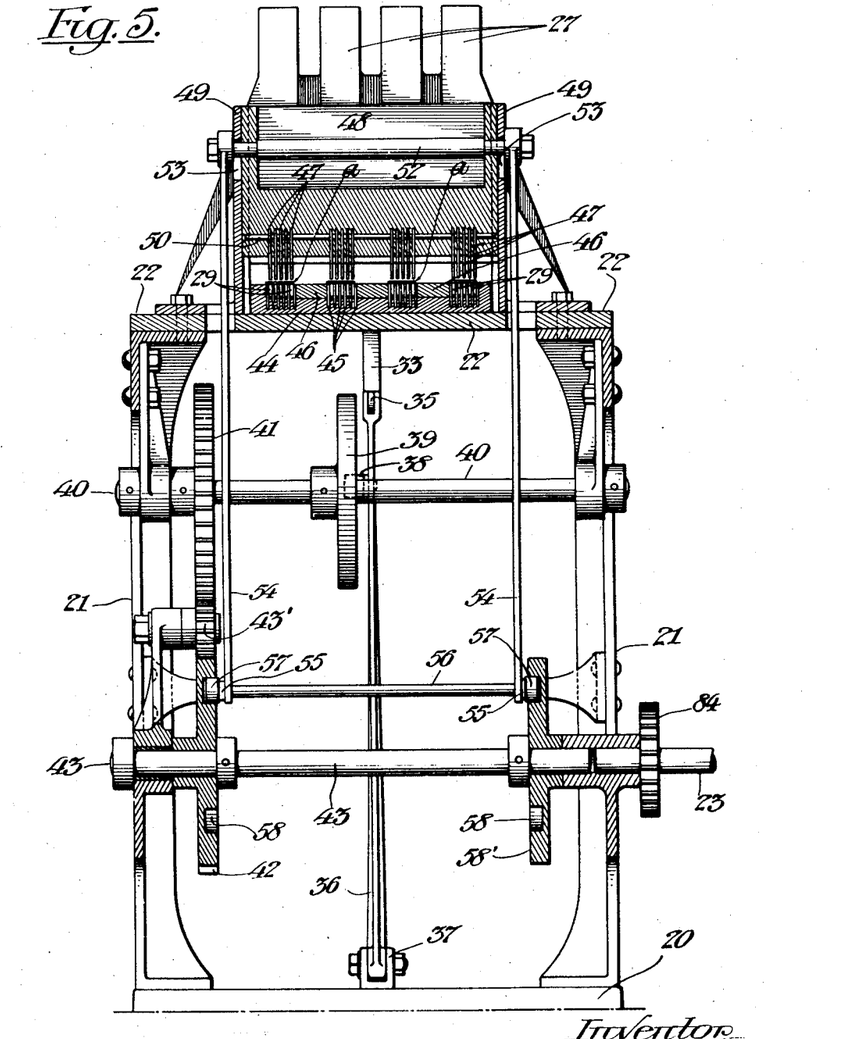
Fig. 5 is a section on a plane through the splint forming mechanism of the card-match making mechanism, as on the line 5—5 of Fig. 3.
Figure 6:
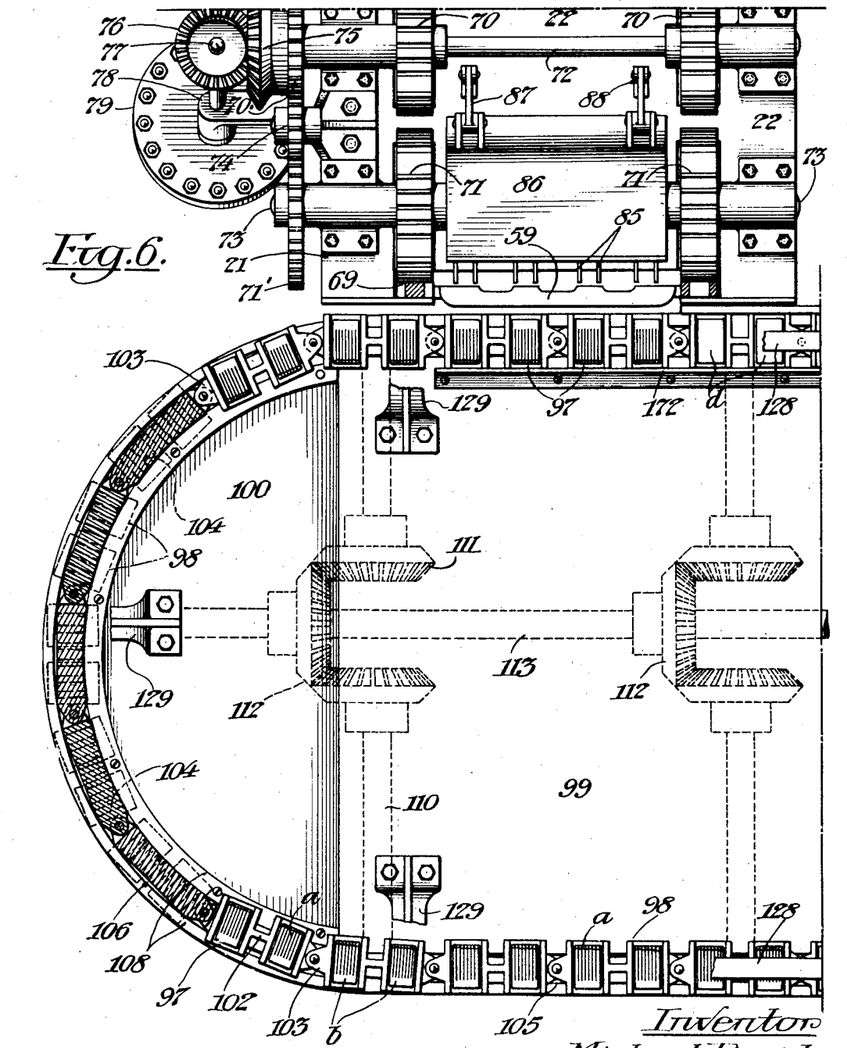
Fig. 6 is a partial plan of the card-match mechanism and the adjacent part of the chambered receiving carrier and adjuncts, said carrier being partly shown in section.

The interior of each hopper is rectangular in cross-section and it is proportioned to receive freely, (so that they may bodily descend therein,) a stack of veneer blanks 28, whereof each is of proper size and shape for a book-match card. The bottoms of the hoppers are constituted by a series of horizontally-reciprocative step plungers 29 which are formed on or affixed to a slide 30 mounted in parallel guides 31 on the table 22, each of the plungers being longitudinally slotted similarly to a comb, and having between its steps a shoulder 32 equal in depth to the thickness of a blank, whereby during each reciprocation of the slide and its plungers the lowermost blanks are simultaneously advanced from the respective hoppers. The slide 30 is provided with a depending bracket 33 which extends through a slot 34 in the table and is fixedly connected by means of a link 35 with the upper end of a lever 36 which is pivoted at its lower end to a bracket 37 on the bed of the main frame. (See Figs. 3, 4 and 5). The lever 36 is provided with a suitably-disposed roller 38 in register with the appropriately shaped groove of a face cam 39 on a driven shaft 40 extending transversely of the frame. The shaft 40 has fixed thereon a spur wheel 41 which is driven from a similar wheel 42 on a lower shaft 43 through an interposed idler gear 43', said latter shaft being geared with and driven by the main shaft 23 as hereinafter described. By this construction the cam 39 is positively rotated, and the lever 36 perforce is actuated thereby in a manner to reciprocate the plunger slide 30 at predetermined intervals.

The series of blanks are ejected from the hoppers 27 to and upon the lower spaced die members, respectively, of a corresponding series of splint cutting instrumentalities, whereby each of the blanks is partially severed throughout its width, longitudinally of the grain of the wood, to provide a row of splints $a$ having a common marginal connection $b$ at one end, the alternate splints being inclined below the others, or "staggered", as shown. (See Figs. 7, 8 and 9).

The lower die members comprise a bed plate 44 which is bolted upon the table 22, said plate having a series of rows of grooves transversely thereof for the reception and retention of a group of parallel cutter blades 45, space or filler blocks 46 being preferably interposed between the adjacent groups of blades. (See Figs. 5 and 9). The blades 45 of each group are spaced apart correspondingly with the comb-like members of the plungers 29, and are so disposed that such members reciprocate between adjacent blades.

The complementary splint cutting members comprise rows of spaced punches 47 which alternate with the blades 45 of their respective groups. These punches are affixed to and are carried by a vertically-reciprocative cross-head 48, which, overhanging the dies, is guided by and between upstanding brackets 49 on the table 22. The groups of punches 47 are entered in kerfs in the base of the cross-head and are locked therein by means of bolts 50 extending through the head and punches. Side plates 51, below which the lower or acting edges of the punches extend, are preferably affixed to the sides of the cross-head so as to embrace and support the bodies of the punches. (See Figs. 5 and 7.)

Extending through the cross head, longitudinally thereof, is a bar 52 the outwardly projecting ends of which extend through vertical slots 53 in the standards 49 and are connected by means of a pair of links 54 with rock-levers 55 which are fulcrumed to brackets on the main frame. A rod 56 connects the links and levers, the ends of said rod bearing rollers 57 which run in the grooves 58 of counterpart face cams fast on the driven shaft 43, one of which grooves is formed in the face of the gear wheel 42 previously referred to, and the other in a cam body 58'. (See Figs. 4 and 5.) The contour of the cam grooves is such that the cross head 48 and its punches are reciprocated in timely relation to the feed plungers 29; that is to say, the plungers move forward and back and the punches then move down and up. In the forward stroke of the plungers a row of blanks 28 is deposited upon the lower die members 45 and in the down stroke of the punches the said blanks are cut to form splint cards. The acting edges of the punches 47 are inclined as shown so that as they pass between adjacent fixed blades 45 the alternate splints are deflected below the others, which latter are supported on the blades. (See Figs. 7, 8 and 9.)

In each forward movement of the plungers 29, while they are advancing a row of blanks from the hoppers to the cutting position, the forward ends of the plungers impinge against the opposing free ends of the downwardly deflected splints of the respective splint cards just previously produced, and advance the latter toward an endless carrier 59 in such a manner that the margins of the respective splint cards are inserted into and held by the carrier. The acting ends of the plungers 29 are preferably grooved, as at 60, to embrace the free extremities of the deflected splints. The carrier is intermittently movable in a path at right angles to that of the plungers, and is provided with appropriately-spaced card receiving and holding elements which are presented to the marginal portions of the successive rows of splint cards, as will presently appear.

In order to obviate liability of the retraction of the positioned blanks 28 by the backward movement of the plungers 29, I preferably provide each of the hoppers 27 with a pivoted gravity dog 61, the free end of which is so disposed as to take against an edge of each blank after it has been transferred from the hopper to cutting position. The acting ends of the dogs during the forward movement of the blanks rest upon the tops of the latter.

Figure 7:
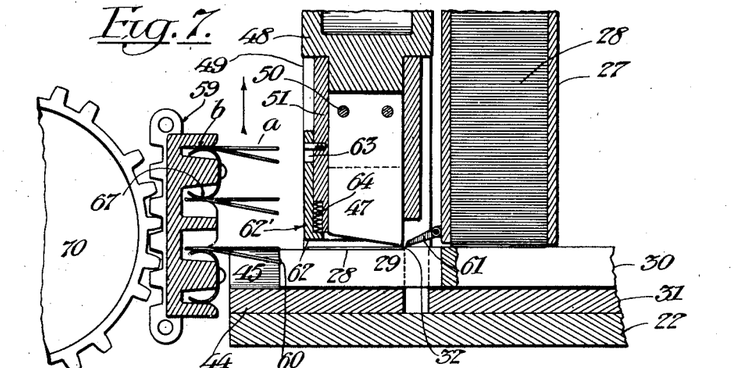
Fig. 7 is a partial vertical section, enlarged, through one of the veneer-blank hoppers, the splint forming mechanism and adjacent elements, showing the relation of the parts when the blank feeding plunger is at the limit of its forward stroke immediately upon the entry of a splint card into the carrier of the match-card making mechanism, a fragment of said carrier being shown in section.
Figure 8:
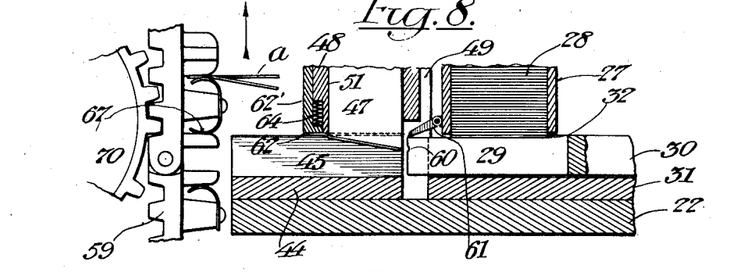
Fig. 8 is a similar view showing the relation of the parts when the plunger is retracted, the carrier being in elevation.
Figure 9:
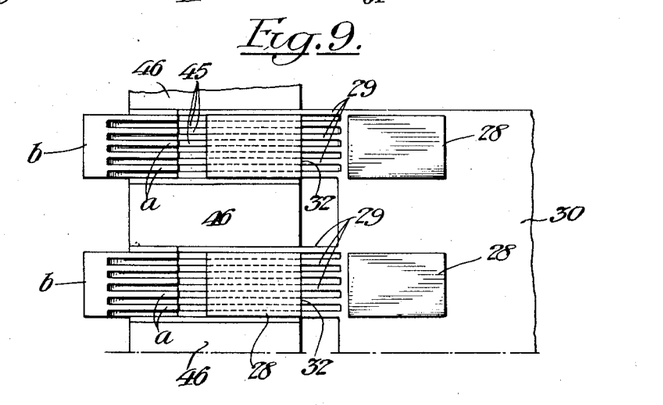
Fig. 9 is a diagram, in plan, of two of the blank feeding plungers and the complementary splint forming devices, showing said elements, together with the blanks and splint cards, in the relative positions illustrated in Fig. 7.

In order also to obviate any liability of vertical displacement of the splint cards during the ascent of the punches 47 therefrom, I preferably provide the cross-head 48 with a yielding pressure foot 62 comprising, in the present instance, the flanged lower end of a vertically-movable plate 62' which is slidingly fitted to the outer faces of the side plate 51 adjacent the carrier 59. The plate 62' has vertical slots 63 therein through which extend guide pins from the plate 51, which latter has in its lower end vertical sockets (of which one is shown in Figs. 7 and 8) containing compression springs 64 that are arranged to bear upon the pressure foot and thus tend to maintain it normally depressed. The pressure construction just described is such that in the descent of the punches the foot 62 bears yieldingly upon the underlying blank and remains thereon for a brief interval during the initial upward stroke of the punches; whereupon the said foot is retracted by and with the cross-head.

Figure 1:
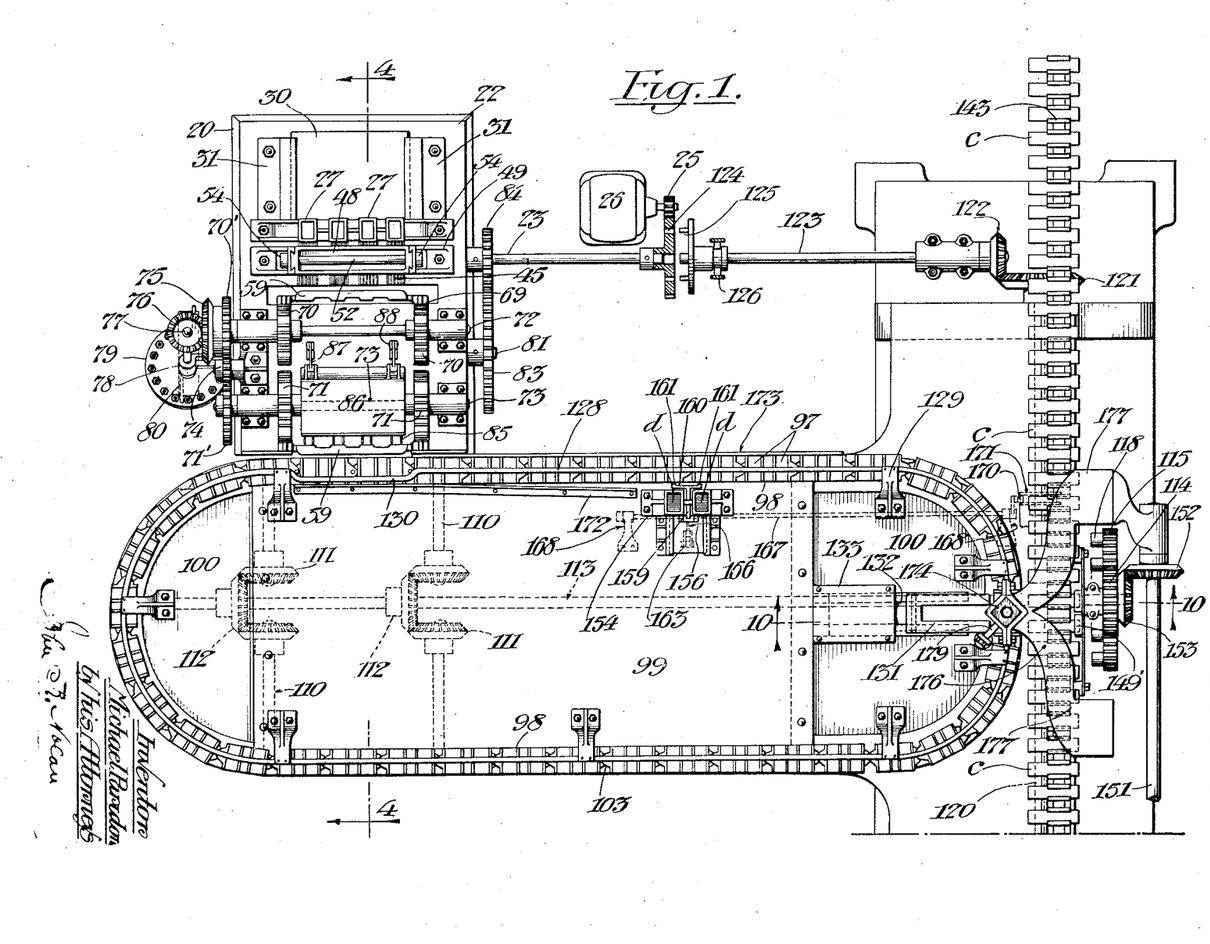
Figure 1 is a plan of a machine embodying my invention, only so much of the card-match making and book-cover applying machanisms being shown as is necessary to illustrate the improvements.
Figure 2:
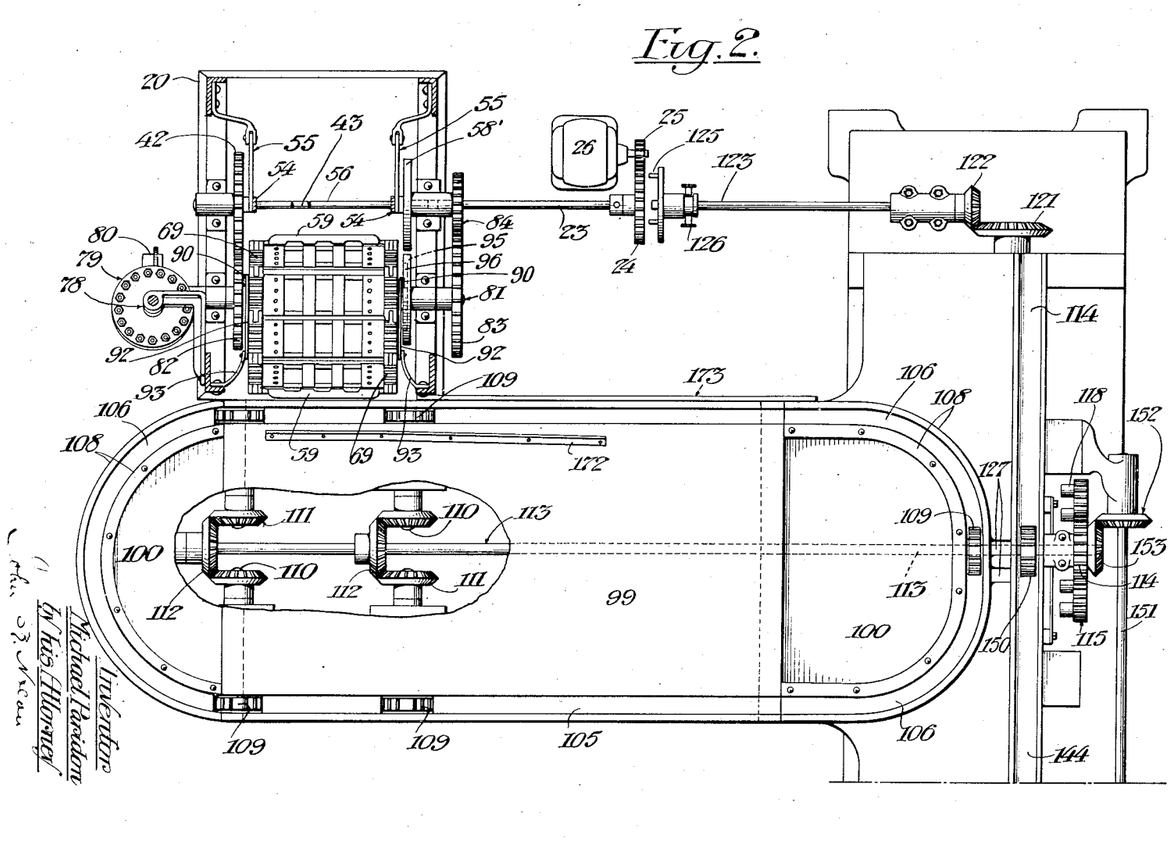
Fig. 2 is a similar view, showing the card-match making mechanism in section, various elements being omitted in order to expose parts otherwise concealed.
Figures 16, 17, 18, 19:
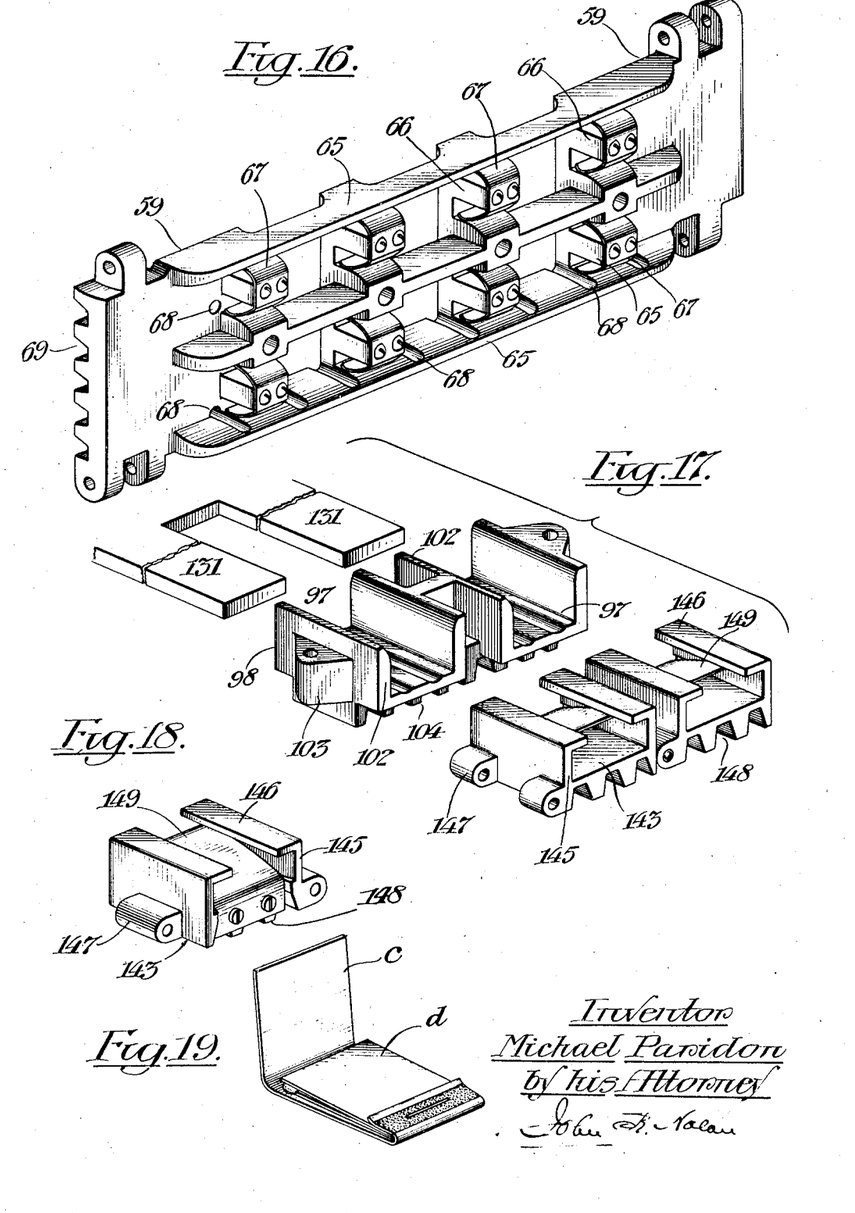
Fig. 16 is a perspective view, enlarged, of one of the links of the endless carrier of the card-match making machine.
Fig. 17 is a perspective view of adjacent links of the chambered carrier and the book-cover carrier, together with the active end of the plunger for transferring the card matches from the former to the latter carrier.
Fig. 18 is a perspective view of one of the links of the book-cover carrier.
Fig. 19 is a perspective view of a type of match book such as a machine embodying the principles of my invention is designed to produce.

Any suitable form of carrier for the splint cards may be employed. In the present instance the carrier comprises an endless chain of link members which are supported and guided throughout the match making path, in which are included any usual or approved impregnating, paraffining and composition applying mechanisms. Each link member (see Fig. 16) comprises a skeleton body portion having parallel walls or ribs 65 on its outer side, with suitably-disposed rows of projections 66 in the spaces between adjacent walls. These projections have affixed thereto spring clips 67 the respective jaws of which are arranged to bear yieldingly against the opposing walls 65 and thus operate to clamp and hold the margins of the respective splint cards when the latter are advanced to the carrier. The body of the link is provided adjacent the respective clamping jaws, with perforations 68 for the free passage of reciprocating punches, whereby the finished card matches are ejected from the carrier at the discharging station, as will hereinafter appear. Such body also is provided on its inner side with marginal gear teeth 69, whereby when the links are hingedly connected an endless gear rack is provided. Suitably-located pairs of driving wheels mesh with the gear rack at various points in the route of the carrier. In the present instance the driving gear wheels 70, 71 at the receiving and discharging stations respectively are shown in Figs. 1 and 2, said wheels being carried by parallel shafts 72, 73 respectively. Fast on these shafts, exteriorly of the frame work, are two gear wheels 70', 71', respectively, between which is suitably mounted an intermeshing idler gear 74. On one end of the shaft 72 is a bevel wheel 75 in mesh with a similar wheel 76 on the upper end of an inclined shaft 77 having its bearings in brackets 78 on the adjacent standard of the main frame. On the lower end of the shaft 77 is a pin wheel 79 in mesh with a peripheral cam wheel 80 on a transverse shaft 81 having its bearings in boxes on the main frame. This shaft 81 bears two spaced gear wheels 82, 83 the former of which meshes with the gear wheel 42 on the shaft 43 and the other wheel 83 meshes with a gear wheel 84 on the main drive shaft 23. (See Figs. 1, 2 and 3). By the gearing just described the motion is transmitted from the drive shaft to the shaft 81 and thence to the shaft 43, thereby effecting concurrent rotation of said shafts 81 and 43. The carrier is intermittently actuated from the shaft 81 through the cam, pin wheel and gear elements indicated, so as to present the clamping elements successively to the rows of splint cards at the receiving station, and also to position the succeeding rows of finished match cards in the path of the ejecting punches 85 at the discharging station. (See Fig. 4). These punches are carried by a horizontally-reciprocative cross-head 86 which is longitudinally slotted to embrace and clear the shaft 73. Said head is connected by means of links 87 with the upper arms of spaced crank-levers 88 on a transverse rock shaft 89 having its bearings in depending brackets on the table 22. The other arms of these levers are jointed to depending links 90, the lower ends of which are in turn pivotally connected by means of a cross-rod 91 to rock-levers 92 fulcrumed on brackets 93 on the main frame. The ends of this rod are provided with rollers 94 which register with the grooves 95 of counter-part face cams fast on the shaft 81, one of which grooves is formed in the face of the gear wheel 82 and the other in a cam body 96, (Fig. 2.) These grooves are of such configuration that the jointed lever and link connections are actuated in a manner to effect the timely reciprocations of the punch head 86 and its punches during the intervals of rest of the carrier 59.

As each series of finished card matches are discharged from the carrier 59, they are deposited flatwise in spaced compartments or chambers 97 of an endless carrier 98 which is constructed and arranged to travel in a horizontal path directly in front of the first-named carrier. The chambered carrier is sustained and guided throughout its travel in a continuous run-way on a horizontal table comprising a main portion 99 extending at right angles to the frame of the card-match machine and extensions 100 at the respective ends of such main portion; said table being supported by a suitable frame work 101, as will presently appear. This carrier 98, in its preferred form, includes a succession of links hingedly connected in the form of an endless chain. Each link comprises a body having four upstanding parallel walls 102 which are spaced apart to provide two separate chambers open at front and back, the space between the chambers being equal to that between adjacent card matches on the carrier 59. The ends of the body are provided with lugs 103 by means of which adjoining links are flexibly connected by pivot pins, and the bottom of the body is provided with a series of transverse gear teeth 104. When the links are pivotally united the chambers thereof are equally spaced apart throughout the length of the chain, and the succession of gear teeth constitutes a continuous gear rack. (See Figs. 1, 4, 6 and 17.)

The run-way on the table comprises parallel channels 105 connected by curved end channels 106, which channels 105, 106 receive the gear teeth of the chambered carrier. The channels 105 are formed directly in the body 99 of the table, and the end channels 106 are constituted by pairs of spaced curved strips 108 which are affixed to the end extensions 100 of the table. The tops of the strips 108 are on the same plane as the top of the main portion of the table, so that the bodies of the links during their travel bear uniformly on the tops of the table and strips respectively. The inner side of each of the link bodies is curved correspondingly with the inner guide strips 108 so as to conform to the curvature of the latter when the links are passing about the strips at the respective ends of the table. (See Fig. 6.)

The bottoms of the longitudinally extending channels 105 are provided with suitably-located openings which receive two pairs of gear wheels 109 in mesh with the teeth 104 of the adjacent runs of the carrier 98. These gears are fast on shafts 110 which terminate short of the median longitudinal line of the table 99 and bear on their inner ends bevel gear wheels 111. Meshing with each pair of bevel wheels is a similar wheel 112 on a longitudinally-extending shaft 113 which is intermittently driven from a suitable source of power, whereby the chambered carrier is advanced step-by-step, each step comprising the length of a single link.

In the present instance one end of the shaft 113 extends to and beyond that end of the table remote from the card match machine, such end of the shaft bearing a pinion 114 in mesh with a spur wheel 115 which is mounted on a stud-shaft 116 projecting from a standard 117 of the main frame of a cover applying machine hereinafter mentioned. On the inner face of this spur wheel are mounted a series of spaced pins 118 with which successively engages a spiral cam 119 on a shaft 120 extending at right angles to the shaft 113. The shaft 120 bears at one end a bevel gear 121 in mesh with a similar gear 122 on a shaft 123 which extends adjacent to and in axial alinement with the power driven main shaft 23 of the card-match machine. Clutch mechanism is preferably provided whereby the shafts 23 and 123 may be operatively coupled at will in order to effect their concurrent rotation; or whereby the shaft 123 may be rendered idle without stopping the operation of the card-match machine, as desired. Preferably the gear 24 on the power shaft 23 is perforated, as at 124, to constitute a clutch member, and the complementary pin member 125 for coöperation therewith is slidingly mounted on the adjacent end of the shaft 123. By means of a suitable clutch lever 126 connected with the member 125 the latter may be properly shifted into active or idle relation to the driving gear element 24 at the will of the attendant. (See Figs. 1 and 2.) During the operation of the shaft 123 motion is transmitted through the gears 122, 121 to the shaft 120 and the spiral cam 119 thereon, which cam by its action upon the succeeding pins 118 intermittently rotates the spur wheel 115; the requisite movements being transmitted thence to the chambered carrier 98 through the intermediate gearing previously described.

During each dwell of the carrier 98 two links thereof, i. e., four chambers, are located in front of the discharging station of the card-match machine and four complete card-matches are thus deposited flatwise within the respective chambers, that is, one card in each chamber. In the succeeding step of the carrier, the link previously supplied with two cards at the right of the discharging mechanism, as view in Fig. 1, is advanced into position at the left of said mechanism and at the same time the next succeeding empty link is presented at the right of the mechanism. In the operation of the discharging mechanism two additional match-cards are deposited in the chambers of the link at the left, and two cards are deposited in the chambers of the link at the right. Hence as the carrier is intermittently advanced two card matches are deposited in each succeeding chamber at the discharging mechanism. The pairs of superposed card matches are borne by the carrier 98 until they reach the right hand end of the machine, and aline with a pair of spaced parallel channels 127 formed in the table extension 100, whereupon the two spaced pairs of card matches are ejected from the carrier into said channels and pushed thence into suitably-positioned cover blanks c respectively. These cover blanks are preferably presented to the path of the card matches by mechanism which will be hereinafter described.

Overhanging the chambered carrier 98, throughout its endless path, is a continuous rail 128 which is supported by brackets 129 arranged on the table 99, 100 at different points in proximity to such carrier, which rail serves as a guard to prevent upward displacement of said carrier during its travel. The portion of the rail adjacent to the card-match machine carrier 59 is offset, as at 130, in order to allow the free delivery of the card-matches to the chambered carrier. (See Fig. 1.)

The means herein illustrated for transferring the card matches from the chambered carrier 98 to the cover-carrying mechanism, comprises a bifurcated plunger 131 which is reciprocative across the path of the adjacent part of the carrier, the limbs of said plunger being formed and spaced to pass through two adjacent chambers of the carrier 98 and thus act endwise against the marginal portions of the card matches within said chambers. The plunger is connected to a slide 132 which is fitted to a guide bracket 133 on the adjacent table extension 100. A depending lug 134 on the slide 132 is jointed through a link 135 with the upper arm of a lever 136 that is fulcrumed on a stud shaft 137 extending from a depending bracket 138 on the table extension. The lower arm of the lever 136 is connected by means of a link 139 with a rock-arm 140 which is pivoted to a bracket on the frame bed. On this rock-arm is a roller 141 which engages a face cam 142 on the shaft 120, the contour of the cam groove being such as to effect the timely reciprocation of the slide for the purpose stated. (See Figs. 1, 10 and 17.)

The mechanism herein illustrated for presenting the cover blanks to the path of the card matches includes an endless carrier 143 the upper horizontal run of which is arranged to travel adjacent the discharging zone of the chambered carrier 98 in a horizontal path at right angles to the longitudinal axis of the latter. The upper run of the carrier 143 is supported and guided in a channel 144 in the top of a right angular projection of the adjacent table extension 100. (Fig. 1.) This cover carrier 143 comprises links of peculiar construction hingedly connected in the form of an endless chain which is supported and guided at various points throughout its course by guide wheels which are suitably mounted upon appropriate frame work, as fully set out in the Patent No. 1,042,472 above mentioned. Each link comprises a bottom having upstanding end walls 145 with overhanging top flanges 146. The ends are provided with lugs 147 by means of which the adjacent links are hingedly connected by pivot pins; and the underside of each link is provided with gear teeth 148 with which engage driving gears at various points in the course of the carrier. Within the link is arranged a spring plate 149 which inclines from the forward side edge of the bottom to and against the underside of the top flanges 146 near the opposite side of the link. The lower edge of this plate is conveniently affixed to the side of the link, so that the upper or free end bears yieldingly against the flanges. (See Figs. 1, 10, 17 and 18.)

As described in Patent No. 1,042,472, the folded ends of cover blanks (c) are introduced to the links at one end of the cover carrier, that is to say, the folded end of each blank is entered between the spring plate and the flanges and is carried beyond the outer side of the link, so that the spring plate clamps the body of the blank within the link. (See Fig. 10.) The carrier is intermittently impelled to advance the links, with the covers therein, to a position adjacent the paths of the card matches when they are ejected from the chambered carrier. Such card matches are thus pushed into the opposing links in which the covers are clamped, the spring plates 149 yielding to permit the passage of the card matches into and through the links. The marginal ends (b) of the card matches are pushed entirely through the links and into the opposing folded ends of the covers; it being noted that suitably-disposed flanged backer members 149' for the support of the folded ends of the cover blanks are affixed to the adjacent table extension 100. As the cover carrier progresses the successive pairs of links thereof are positioned at proper intervals of time to receive the card matches from the chambered carrier 98; and the associated matches and covers are carried thence through suitable binding; painting; drying, and folding stations as fully set out in Patent No. 1,042,472 aforesaid.

Figure 10:
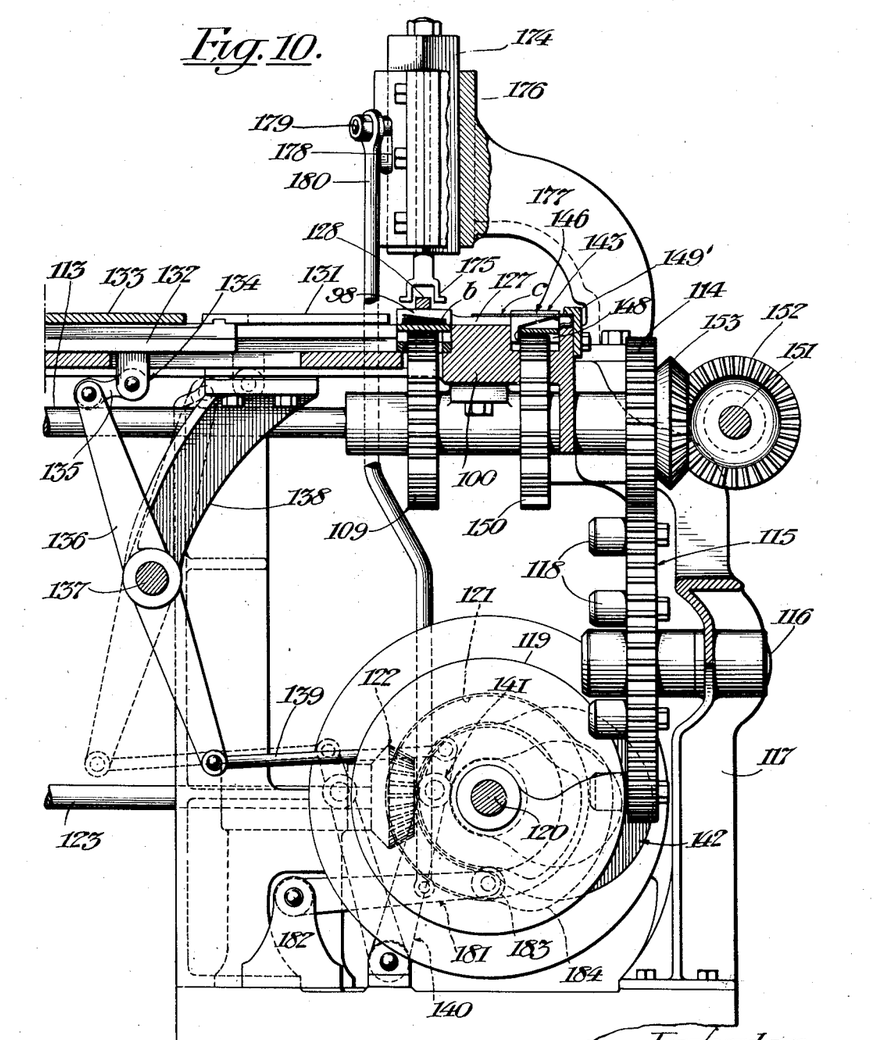
Fig. 10 is a vertical section, partly in elevation, on a plane through the plunger mechanism for delivering the associated card matches to the cover-carrier, as on the line 10—10 of Fig. 1.
Figures 11, 12, 13:
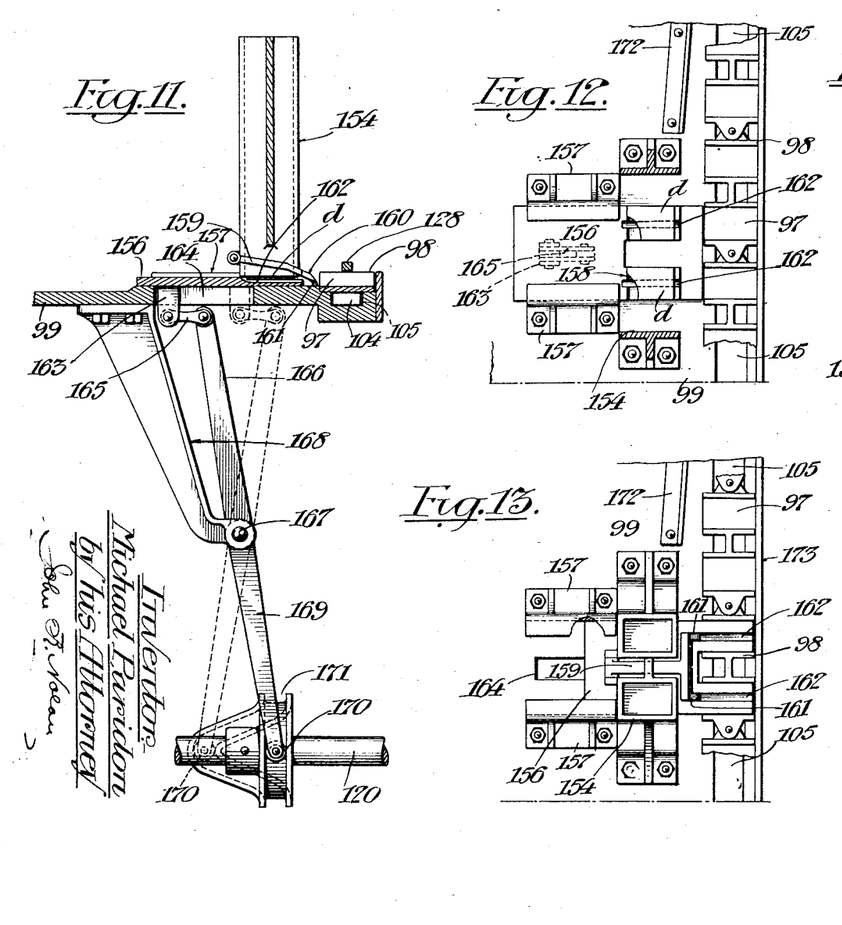
Fig. 11 is a partial vertical section through the chambered carrier on a plane between the members of a twin hopper from which protective cover cards are delivered to said carrier; the delivery plunger as in retracted position together with its actuating elements being shown.
Fig. 12 is a sectional plan of the construction shown in Fig. 11, the hopper being removed.
Fig. 13 is a plan of the construction shown in Fig. 11, the plunger being illustrated in forward position as delivering protective cover cards to the chambered carrier.
Figure 14:
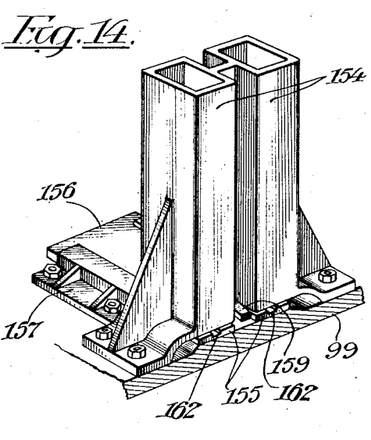
Fig. 14 is a sectional perspective view of the protective-card hoppers and the delivery plunger therefor.
Figure 15:
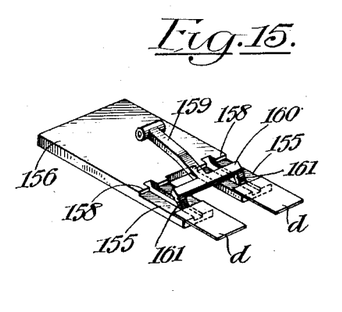
Fig. 15 is a skeleton perspective view, showing the plunger; a pair of protective cover cards ejected thereby, and the stripper dog for preventing retrograde movement of the cards.

The intermittent movement of the cover carrier along the guide channel 144 is effected through the medium of pinions which mesh with the gear teeth on the bottoms of the carrier links. One of these pinions, indicated at 150, Fig. 10, is mounted on the shaft 113, the bottom of the channel having therein an opening for the free passage of the pinion to the teeth of the cover carrier. Additional pinions, similarly engaging the carrier teeth at other points, are actuated from the shaft 113 through an auxiliary shaft 151 bearing a bevel wheel 152 in mesh with a wheel 153 on the shaft 113, as described in Patent No. 1,042,472 above mentioned.

Means are provided whereby supplemental blank cards $d$ of paper or paste board, are associated with the card matches in the respective chambers of the carrier 98 in order that the associated elements shall be transferred from the said carrier to the cover blanks, and the book matches when completed thus include protective cover flaps or "flame guards" for the matches, as described in Patent No. 1,168,900 dated January 18, 1916.

The cards $d$ are supplied to the respective chambers of the carrier 98 before the card matches are introduced to said chambers; and hence as each chamber progresses from the card match machine to the ejecting station adjacent the cover carrier, such chamber contains a blank card and two card matches imposed thereon. In the present instance the blank cards are stacked in the compartments of a twin hopper 154 which is supported upon the table 99 adjacent the inner longitudinal run of the carrier 98. The hopper compartments are spaced correspondingly with two adjacent chambers of the carrier 98 and are in alinement with such chambers during each dwell thereof. The bottoms of the hopper compartments are constituted by the respective spaced step members 155 of a bifurcated slide 156 which is fitted to parallel guides 157 on the table 99, said members by actuation of the slide being reciprocative into and from the adjacent chambers of the carrier 98. (See Figs. 1, and 11 to 15, inclusive.) The steps of the members 155 include transverse shoulders 158 which are equal in depth to the thickness of a blank card $d$, and are so disposed that during each reciprocation of the slide the lowermost cards in the two hopper compartments, are advanced therefrom into the adjacent chambers of the carrier 98. As a simple and efficient means to prevent the withdrawal of the individual cards from the chambers of the carrier, during the retraction of the slide 156, I pivot between the two hopper structures a gravity dog 159 having at its free end a cross-bar 160 bearing spaced teeth 161 which overhang the paths of the respective members of the slide 156 and thus rest loosely upon the tops of the proximate cards as the latter are being advanced to the chambers of the carrier. When the cards are fully entered into such chambers the edges of the cards escape the respective teeth of the dog, which teeth, upon the descent of the dog, drop behind the cards and serve as a back stop therefor. Preferably the upper surface of each of the members 155 has a median longitudinal groove 162 therein which receives the descending tooth of the dog when the card clears the latter, such tooth thus presenting a still more effective back stop to the edge of the card positioned within the chamber of the carrier.

In the present instance the slide 156 is provided on its under side with a lug 163 which extends through a slot 164 in the table 99, and is flexibly connected by means of a link 165 to an upstanding arm 166 on a rocker-shaft 167 which is journaled in brackets 168 beneath said table. One end of this shaft extends toward the driven shaft 120 and is provided with an arm 169 bearing a roller 170 in register with the peripheral groove of a cam 171 fast on the latter shaft. The contour of the cam is such that during its rotation the rocker arm 169 and its connections are periodically actuated to effect the reciprocation of the slide 156 during each dwell of the chambered carrier 98. (See Figs. 1 and 11.)

I preferably affix to the table 99, adjacent the inner side of the receiving run of the carrier 98 a cam bar 172 which extends from the hopper 154 to and in front of the card match machine, the face of which bar is slightly inclined so as gradually to press into the chambers of the carrier any cards that may be accidentally projecting from the inner side of the chamber. (See Figs. 1, 2, 12 and 13.)

A suitably-disposed guard rail 173 arranged on the table 99, adjacent to and longitudinally of the outer side of the inner run of the carrier 98, prevents accidental outward displacement of the cards contained in the chambers.

In order to press down and level the contents of the respective pairs of chambers of the carrier 98, and thus insure the proper disposition within said chambers of any card elements that may happen to be tilted therein, I provide a suitable pressure mechanism which is so arranged and operated as to enter and recede from each pair of chambers preparatory to the reciprocation of the plunger members 131 through said chambers. In the form illustrated this mechanism comprises a vertically-reciprocative plunger 174 having at its lower end a divided presser foot 175, the members of which are constructed and arranged to enter each pair of chambers while the latter are at rest at the ejecting station. The foot members are ∩-shaped so as to straddle the underlying guard rail 128, as clearly seen in Fig. 10. The plunger 174 is vertically guided in an overhanging guide structure 176 carried by bracket arm 177 which are secured to an adjacent portion of the supporting frame work; one of the walls of such structure being longitudinally slotted, as at 178, for the passage of an outwardly projecting stud 179 on the plunger. A link 180, which is hung on the stud 179 is pivotally connected to a rock-lever 181 fulcrumed on a bracket 182 on the bed of the adjacent frame work. The free end of this rock-lever bears a roller 183 which runs in the groove of a face cam 184 fast on the shaft 120; the contour of the cam being such that during each rotation of the latter the lever 181 is oscillated in a manner to effect, through the link connection described, the timely vertical reciprocation of the plunger 174 and its presser foot in respect to the underlying chambers of the carrier 98.

It is to be understood that my invention is not limited to the specific mechanisms or to the details of construction thereof herein illustrated, as the same may be variously modified without departing from the principle of the invention as defined in the appended claims.

I claim—

1. The combination with mechanism for making card matches, including an endless carrier constructed to support spaced apart rows of separated card-matches, and means for discharging the rows of card-matches successively from the carrier, of means adjacent to said carrier for receiving the discharged rows of card-matches, means adjacent to said receiving means for supporting match-book covers, and means for transferring the card-matches from the said receiving means to the cover-supporting means.

2. The combination with a source of card-match supply, including means for discharging card-matches therefrom, of a card-match receiving carrier comprising a succession of chambers movable across the path of discharge of said card-matches, means for actuating said carrier, a cover-bearing carrier comprising a succession of cover-supporting devices movable adjacent to the path of the first-named carrier, means for actuating the cover-bearing carrier, and means for transferring the card-matches from the chambers of said card-match receiving carrier to the cover-supporting devices of the cover-bearing carrier.

3. The combination with a source of card-match supply, including means for discharging successive rows of separated card matches therefrom, of a card-match receiving carrier comprising a succession of chambers movable across the path of discharge of said rows, means for actuating said carrier, a cover-bearing carrier comprising a succession of cover-supporting devices movable adjacent the path of the first-named carrier, means for actuating the cover-bearing carrier, and means for transferring the card-matches from the chambers of said receiving carrier to the cover-supporting devices of the cover-bearing carrier.

4. The combination with a source of card-match supply, including means for discharging successive rows of separated match-cards therefrom, of a card-receiving carrier comprising an endless succession of chambers intermittently movable across the path of discharge of succeeding rows of card-matches, whereby a plurality of superposed card-matches are deposited in each chamber, means for actuating said carrier, a cover-bearing carrier comprising a succession of cover-supporting devices movable adjacent to the path of the first-named carrier, means for actuating the cover-bearing carrier whereby a plurality of said supporting devices are caused progressively to aline with a corresponding number of chambers of said receiving carrier, and means for transferring the card-matches from the chambers of the receiving carrier into the said alining supporting devices of the cover-bearing carrier.

5. The combination with a card-match receiving carrier comprising an endless succession of chambers, each of which is constructed and proportioned to receive a plurality of superposed card matches, and means for intermittently moving said carrier, of a cover-bearing carrier comprising a succession of cover-supporting devices movable adjacent to the path of the first-named carrier, means for intermittently actuating the cover-bearing carrier in concert with the card-match receiving carrier, and means for transferring card-matches from the chambers of said receiving carrier to the supporting devices of the covering-bearing carrier.

6. The combination with mechanism for making card-matches, including an endless carrier constructed to support spaced apart rows of separated card-matches, and means for discharging said rows successively from the carrier, of a receiving carrier comprising an endless succession of chambers movable across the path of discharge of the card-matches, means for intermittently moving said receiving carrier at such a speed that a plurality of card-matches are deposited flatwise in each of said chambers, a cover-bearing carrier comprising a succession of cover-supporting devices movable adjacent to the path of the receiving carrier, means for actuating said cover-bearing carrier, and means for transferring the card-matches from the chambers of said receiving carrier to the cover-supporting devices of the cover-bearing carrier.

7. The combination, with mechanism for making matches, including an endless carrier constructed to support spaced apart rows of separated card-matches, and means for discharging said rows successively from the carrier, of a receiving carrier comprising an endless succession of chambers movable across the path of discharge of the card-matches, means for intermittently moving said receiving carrier at such a speed that a plurality of card-matches are deposited flatwise in each of said chambers, a cover-bearing carrier comprising a succession of cover-supporting devices movable adjacent the path of the receiving carrier, means for actuating said cover-bearing carrier at the same speed as the receiving carrier, and means whereby the card-matches are transferred from a plurality of said chambers to a corresponding number of the cover-supporting devices of the cover-bearing carrier.

8. The combination of a carrier comprising an endless succession of chambers, means for moving said carrier, means for feeding a protective card flatwise to each of said chambers in one location in the travel of the carrier, means for feeding card-matches flatwise to said chambers in a second location in the travel of the carrier, means for supporting match-book covers flatwise in a third location in the travel of the carrier, and means for transferring the contents of said chambers to the cover supporting means.

9. The combination with a carrier comprising an endless succession of chambers constructed and proportioned to receive flatwise-disposed card-matches, and means for actuating said carrier, of a protective card containing hopper located adjacent to said carrier, and a plunger for transferring the cards successively from said hopper to the chambers.

10. The combination with a carrier comprising an endless succession of chambers constructed and proportioned to receive flatwise-disposed card-matches, and means for actuating said carrier, of a protective-card containing hopper located adjacent to said carrier, a plunger for transferring the cards successively from said hopper to the said chambers, and a cam bar located adjacent to and longitudinally of said carrier for insuring the correct positioning of the cards within the chambers.

11. The combination with a carrier comprising an endless succession of chambers constructed and proportioned to receive flatwise-disposed card matches, and means for actuating said carrier, of a protective-card containing hopper adjacent said carrier, a plunger for transferring cards successively from said hopper to the chambers, means for actuating said plunger, and means arranged to bear upon said cards during their transference and serve as a back stop therefor during the return strokes of the plunger.

12. The combination with a source of card-match supply, including means for discharging card matches therefrom, of a card-match receiving carrier comprising a succession of chambers movable across the path of discharge of succeeding card-matches, means for actuating said carrier, a pressure device reciprocative into and from said chambers, means for actuating said device, a cover-bearing carrier comprising a succession of cover-supporting devices movable adjacent the path of the first-named carrier, means for actuating the cover-bearing carrier, and means for transferring the card-matches from the chambers of said receiving carrier to the cover-supporting devices of the cover-bearing carrier.

Signed at Barberton in the county of Summit and State of Ohio this 7 day of May A. D. 1918.

MICHAEL PARIDON.